(12) United States Patent
Chen et al.

(10) Patent No.: US 8,537,824 B2
(45) Date of Patent: Sep. 17, 2013

(54) METHOD, SYSTEM AND DEVICES FOR PROCESSING MESSAGES IN MULTIMEDIA MESSAGING SERVICE

(75) Inventors: Kehua Chen, Guangdong (CN);
 Weiming Cheng, Guangdong (CN);
 Dawei Li, Guangdong (CN);
 Guangchang Bai, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 51 days.

(21) Appl. No.: 12/908,650

(22) Filed: Oct. 20, 2010

(65) Prior Publication Data

US 2011/0032943 A1    Feb. 10, 2011

Related U.S. Application Data

(63) Continuation of application No. 11/578,091, filed as application No. PCT/CN2006/001659 on Jul. 13, 2006, now Pat. No. 7,894,835.

(30) Foreign Application Priority Data

Sep. 26, 2005    (CN) .......................... 2005 1 0105072

(51) Int. Cl.
 *H04L 12/56*    (2006.01)
(52) U.S. Cl.
 USPC ....................................................... 370/392
(58) Field of Classification Search
 USPC ......... 455/466, 411, 433; 709/204; 370/392, 370/389
 See application file for complete search history.

(56) References Cited

U.S. PATENT DOCUMENTS

| 6,408,188 | B1 | 6/2002 | Park | |
|---|---|---|---|---|
| 2005/0144233 | A1* | 6/2005 | Kjesbu et al. | 709/204 |
| 2005/0259652 | A1* | 11/2005 | Tang et al. | 370/389 |

FOREIGN PATENT DOCUMENTS

| CN | 1501657 A | 6/2004 |
|---|---|---|
| CN | 1501723 | 6/2004 |
| CN | 1596008 | 3/2005 |
| CN | 100455049 C | 1/2009 |
| EP | 1515514 A1 | 3/2005 |
| EP | 1562338 | 8/2005 |
| EP | 1562338 A1 | 8/2005 |
| WO | WO 03/094534 A2 | 11/2003 |
| WO | WO 2005/076572 A1 | 8/2005 |

OTHER PUBLICATIONS

International Search Report issued in corresponding PCT Application No. PCT/CN2006/001659; dated Nov. 9, 2006, and English translation thereof.

(Continued)

*Primary Examiner* — David Q Nguyen

(57) ABSTRACT

A method for processing messages in MMS, which includes: after receiving a message from a user side, an MMSC notifying a home Value Added Service Applications Server corresponding to receivers of the message to process the message according to each identifier, which is carried in the message, of the receiver that belongs to the Value Added Service Applications Server and that is carried in the message. A system for processing messages in the MMS is further disclosed. By adopting the technique solution provided in the invention, it could successfully implement the message service of a terminal sending messages to multiple receivers that belong to the same Value Added Service Applications Server. Moreover, it could further reduce the message flux between the MMSC and the Value Added Service Applications server so as to reduce the occupancy of the communication resources, increase the efficiency and save the cost.

2 Claims, 6 Drawing Sheets

(56) References Cited

OTHER PUBLICATIONS

3GPP TS23.140 Vs10.0 (Jun. 2005); $3^{rd}$ Generation Partnership; Technical Specification Group Core Network and Terminals; Multimedia Messaging Service (MMS); Functional Description; Stage 2 (Release 6); GSM Global System for Mobile Communication; 2005; 3GPP Organizational Partners (ARIB, ATIS, CCSA, ETSI, TTA, TTC); 217 pages.

Office Action issued in corresponding Russian Patent Application No. 2007104351/09, mailed May 22, 2008.

Office Action issued in commonly owned U.S. Appl. No. 11/578,091, mailed Jul. 26, 2010.

Office Action issued in commonly owned U.S. Appl. No. 11/578,091, mailed Mar. 25, 2010.

Office Action issued in corresponding Chinese Patent Application No. 200510105072.3, mailed Oct. 12, 2007.

Office Action issued in corresponding Chinese Patent Application No. 200680011744.7, mailed Nov. 6, 2009.

Office Action issued in corresponding European Patent Application No. 06753137.6, mailed Jan. 25, 2012.

Extended European Search Report issued in corresponding European Patent Application No. 06753137.6, mailed Aug. 16, 2010.

GSM, "$3^{rd}$ Generation Partnership Project; Technical Specification Group Core Network and Terminals; Multimedia Messaging Service (MMS); Functional Description" Stage 2 (Release 6) 3GPP TS 23.140. V6.10.0, Jun. 2005.

* cited by examiner

METHOD, SYSTEM AND DEVICES FOR PROCESSING MESSAGES IN MULTIMEDIA MESSAGING SERVICE

CROSS-REFERENCE TO RELATED APPLICATIONS

This patent document is a continuation of U.S. patent application Ser. No. 11/578,091, filed on Jul. 13, 2006, which is a 371 of International Application No. PCT/CN2006/001659, filed on Jul. 13, 2006, which claims priority to Chinese Patent Application No. 200510105072.3, filed on Sep. 26, 2005, all of which are hereby incorporated by reference in their entireties.

TECHNICAL FIELD

The present disclosure relates to the field of the Multimedia Messaging Service (MMS), and more particularly, to a method, a system and devices for processing messages in the MMS.

BACKGROUND

The MMS, which is a further development of the Short Message Service (SMS) and the Enhanced Message Service (EMS), provides an integrated end-to-end solution for personal multimedia mobile communication service. FIG. 1 is a schematic diagram illustrating the architecture of an MMS system in the related art. As shown in FIG. 1, the user side mainly includes a Wireless Email Terminal and an MMS User Agent on an MMS User Terminal. The network side mainly comprises an MMS Center (MMSC), a Value Added Service Applications Server and an External Server.

In the Network Elements of the foregoing network side, the MMSC is the core of the MMS system. The MMSC is used for carrying out the protocol transformation, content adaptation, storing and scheduling for Multimedia Messages, passing the Multimedia Message among different multimedia devices, and moreover storing the user information, customized information, and the interface information, etc.; the Value Added Service Applications Server, generally a Service Provider (SP) or a Content Provider (CP), is used to provide the Value Added Service of the MMS. Particularly, an MM7 interface, which usually takes the Hypertext Transfer Protocol (HTTP) as the bearer protocol, is used to carry out the interaction between the MMSC and the SP.

If a message is to be sent from a User Terminal to a user of a certain SP, the message should firstly be sent to the MMSC via the User Agent, and then is transmitted to the home SP corresponding to the receiver of the message. Herein the home SP of the receiver means that the receiver is the service user of the home SP. For instance, supposing that the receiver is an Instant Message (IM) client on the Internet, the home SP of the receiver is an IM server.

In some services, there may be two or more than two receivers of the message sent by the User Agent; furthermore, among these receivers, there may be two or more that two receivers corresponding to an identical home SP. Under the condition, the flow of interaction between the User Agent, the MMSC and the SP is illustrated in FIG. 2. It is assumed that there are two receivers of the message and that the home SP of the two receivers is the same SP. The flow comprises the following steps.

Step 201~Step 202: the User Agent submits the message to the MMSC via an MM1_submit.REQ of the MM1 interface protocol, wherein the two receivers, Recv1 and Recv2, are the service users of the same SP; after the MMSC receiving the MM1_submit.REQ, the MMSC returns a response to the User Agent via an MM1_submit.RES.

Step 203~Step 204: the MMSC resolves the message, determines that there are two receivers of the message, thus makes one copy of the message; the two messages are delivered to the same SP via two MM7_deliver.REQs which both carry the two receiver addresses carried in MM1_submit.REQs; then the SP returns an MM7_deliver.RES to the MMSC, denoting that the SP has successfully received the two MM7_deliver.REQs and will process them.

As described above, when a message includes at least two receivers and the home SP of at least two receivers is the same one, the home SP would receive at least two MM7_deliver.REQs; and each MM7_deliver.REQ includes the addresses of all the receivers. In the method of the SP to process the message, the SP processes the message based on the address in the address field of the receiver, and if there are multiple addresses in the address field, the SP processes the message based on the first address as default. As a result, for the two received MM7_deliver.REQs, the SP processes the message only based on the address of the first message receiver, thus the message could not be respectively processed according to different receivers, e.g. be delivered to different receivers.

SUMMARY

A method for processing messages in Multimedia Message Service (MMS), including:

upon receiving a message from a user side, notifying, by an MMS Center (MMSC), a home Value Added Service Applications Server of receivers of the message to process the message according to each identifier, which is carried in the message, of the receiver that belongs to the Value Added Service Applications Server.

A system for processing messages in Multimedia Message Service (MMS), comprising an MMS Center (MMSC) and a Value Added Service Applications Server, wherein, the MMSC is used for sending a multimedia message to the Value Added Service Applications Server with a deliver request, and notifying the Value Added Service Applications Server to respectively process the multimedia message according to each identifier, which is carried in the multimedia message, of a receiver that belongs to the Value Added Service Applications server; and the Value Added Service Applications Server is used for handling the multimedia message according to the receiver identifier carried in the received deliver request.

A Multimedia Message Service Center (MMSC), including:

a message processing module, for generating a deliver request according to a multimedia message conveyed from a communication interface module, notifying a home Value Added Service Applications Server to process the message according to each identifier, which is carried in the message, of a receiver that belongs to the Value Added Service Applications Server, and conveying the generated deliver request to the MMSC communication interface module to be sent;

the communication interface module, for conveying the received multimedia message to the message processing module, and for sending the deliver request from the message processing module to a Value-Added Service Applications Server.

A Value Add Service Applications Server, including:

a communication interface module, for receiving a deliver request and conveying the received deliver request to a message processing module;

the message processing module is used for handling a multimedia message carried in the deliver request according to a receiver identifier in the deliver request.

DETAILED DESCRIPTION

A further description in detail is hereinafter given to the invention as disclosed herein with reference to the accompanying drawings and embodiments.

According to the embodiments of the disclosure after receiving a message from the user side, the MMSC notifying the SP to which the message receiver belongs to process the message respectively according to each receiver identifier that belongs to the SP and that is carried in the message.

Based on the different ways that the MMSC notifies the SP, to which the message receiver belongs, to process the message respectively according to each receiver identifier that belongs to the SP and that is carried in the message, the scheme of the disclosure is described in detail hereinafter with reference to three embodiments.

Figure 1:
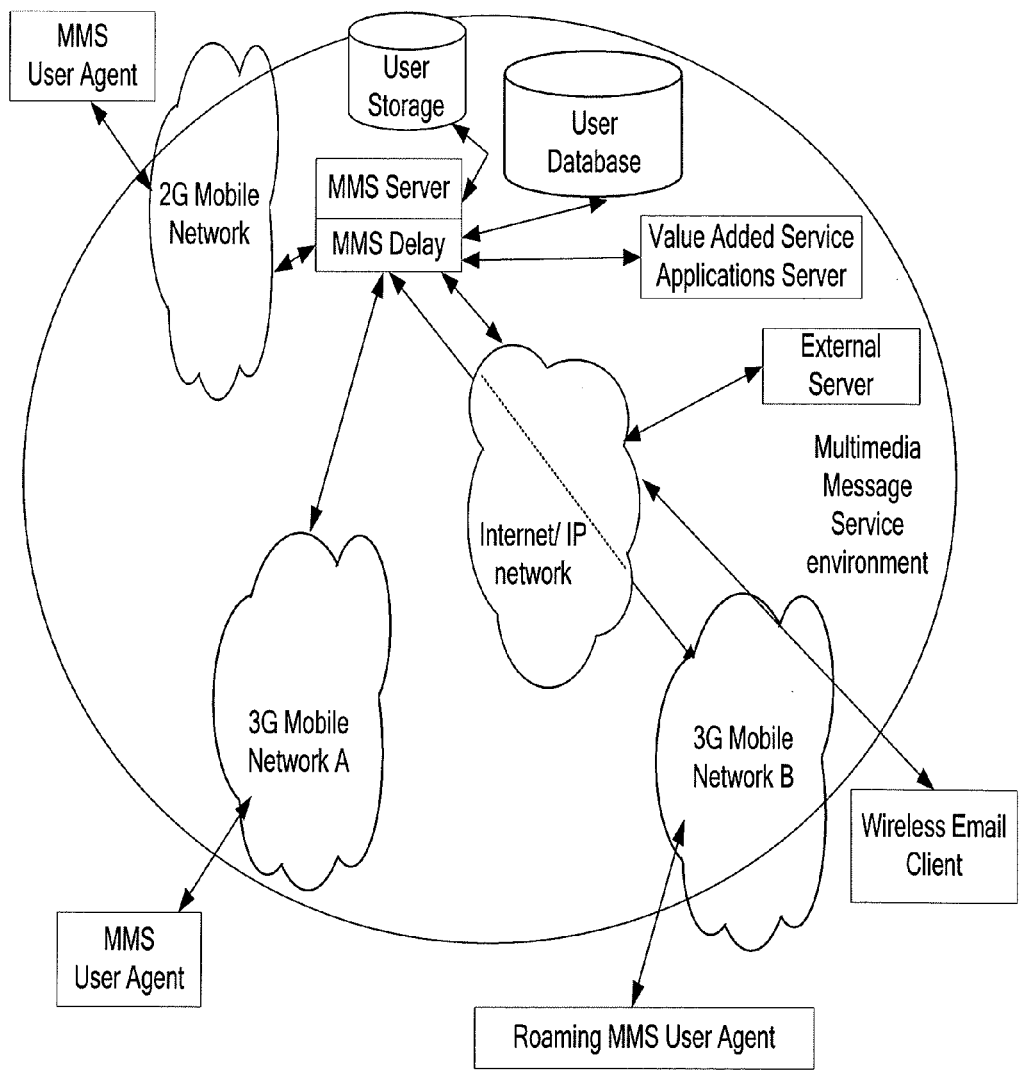
FIG. 1 is a schematic diagram illustrating the architecture of the MMS system in the related art.
Figure 2:
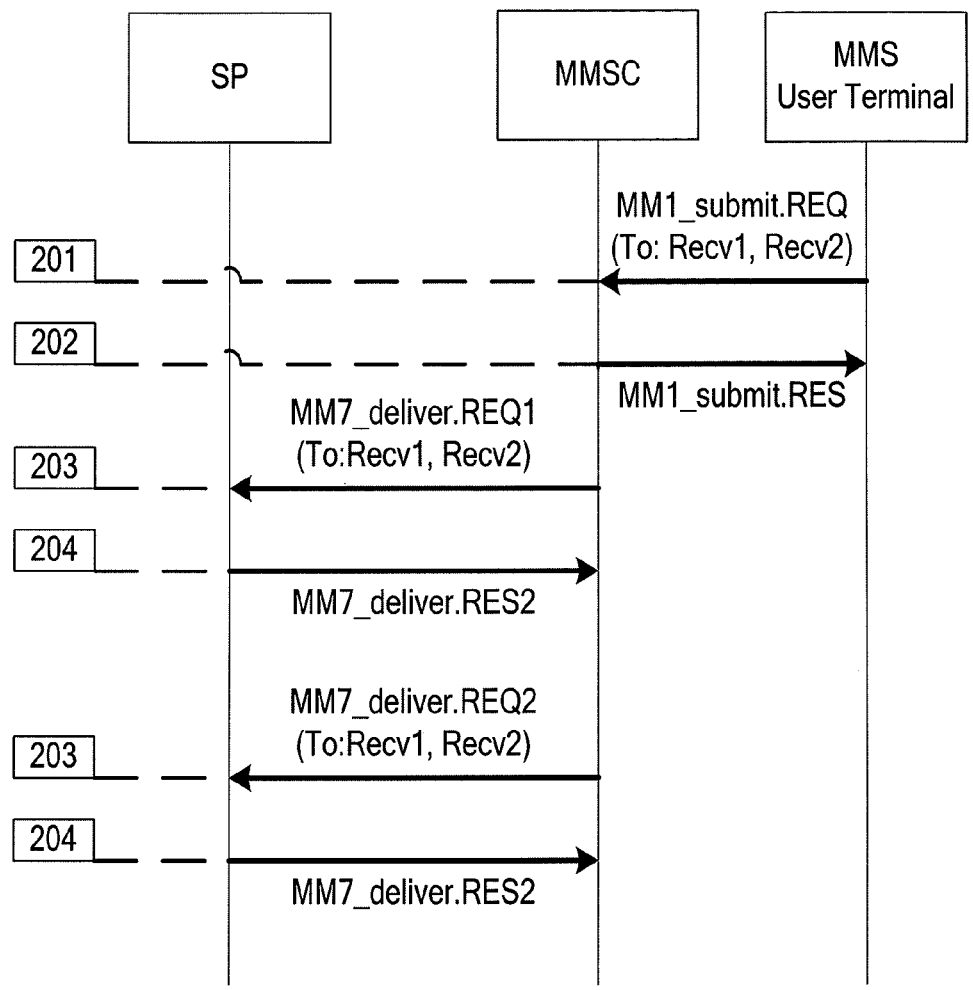
FIG. 2 is a flowchart of processing the message service of a terminal sending a message to multiple receivers which belong to the same SP in the related art.
Figure 3:
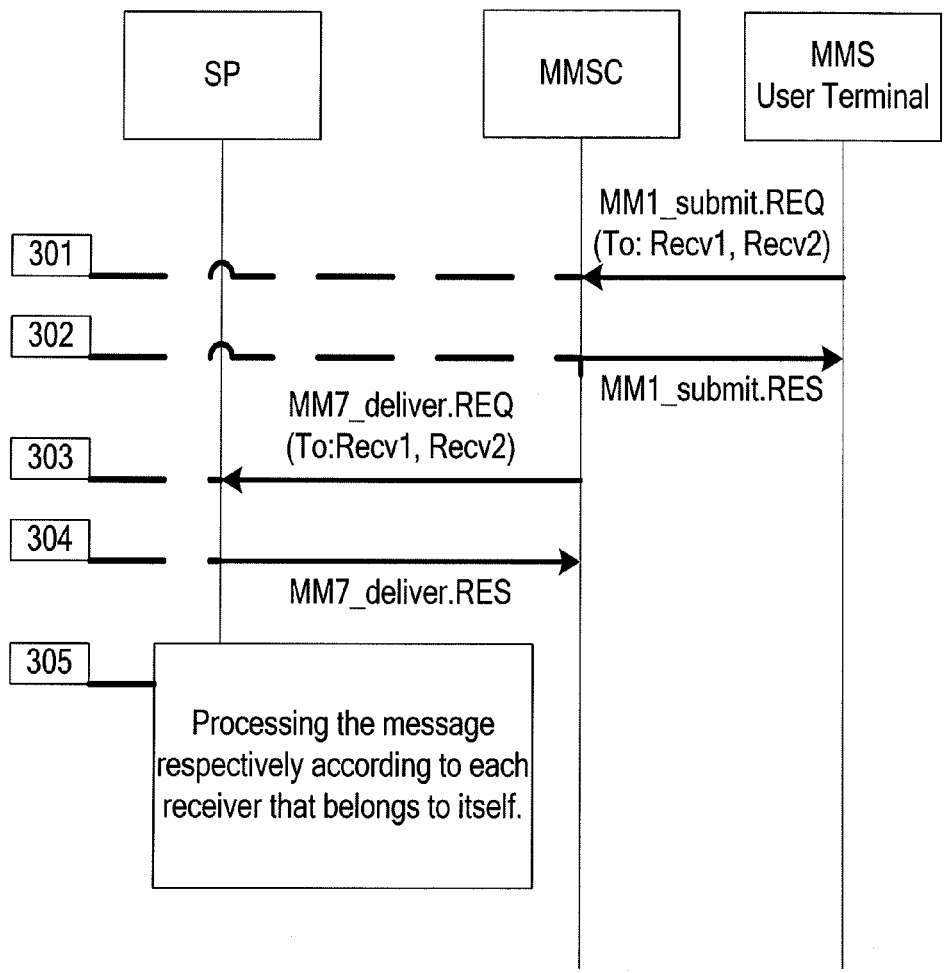
FIG. 3 is a flowchart illustrating the process in accordance with an embodiment of the method for processing messages in the MMS.

FIG. 3 is a flowchart illustrating the process in accordance with an embodiment of the method for processing messages in the MMS. Referring to FIG. 3, the process includes the following steps:

Step 301~Step 302: the User Agent of the terminal submits a message to the MMSC via the MM1_submit.REQ; after receiving the MM1_submit.REQ, the MMSC returns a response to the User Agent via the MM1_submit.RES.

Step 303: the MMSC resolves the receiver of the received message and makes copies of the message according to the number of the home SPs of the receivers in the received message, wherein, the number of the messages after copied is as many as the home SPs which the receivers belong to; and then the MMSC delivers the message to each home SP via an MM7_deliver.REQ respectively.

For example, supposing that there are three receivers A, B and C, wherein B and C belong to the same SP, the number of the home SPs to which the receivers belong is two; and the number of the messages after copied is also two. Only one MM7_deliver.REQ is sent to the SP to which two or more than two receivers belong, i.e. to which multiple receivers belong. The receiver address field in the MM7_deliver.REQ includes all the receiver identifiers in the MM1_submit.REQ.

In accordance with the embodiment of the disclosure, the MMSC could determine whether different receivers belong to the same SP according to the SP Value Added Service Identifier (VASID) and the service code. For example, a mobile telephone user sends a multimedia message to two IM users whose identifiers are 66660012678050 and 66660013456789 respectively; then the MMSC resolves the two identifiers, supposing that the first four numbers 6666 is the service code of a certain SP and the following three numbers 001 is the VASID of the SP, the last seven positions is the identifiers of the IM users. In the MMS systems, both the VASID and service code are of a fixed length so that the MMSC could determine whether the receivers belong to the same SP.

Certainly, after the MMSC receiving the MM1_submit.REQ, the MMSC could first determine whether there are two or more than two receivers of the message and whether there are two or more than two receivers of the message belonging to the same SP. If there are, the MMSC processes the message according to Step 303, otherwise, the processes the message according to the current process.

In fact, the condition that there is only one receiver of the message or that there are multiple receivers but the receivers are as many as the SPs to which the receivers belong, could be regarded as a special case of the cases processed in Step 303. In this point of view, it may be not necessary for the MMSC to determine whether there are two or more than two receivers of the MM1_submit.REQ or whether there are two or more than two receivers belonging to the same SP; instead, the MMSC could process the message according to Step 303 directly.

Step 304: after receiving the MM7_deliver.REQ, the SP returns an MM7_deliver.RES to the MMSC so as to indicate that it has received the request successfully and would process the request.

Step 305: the SP resolves the receiver address field in the MM7_deliver.REQ to find out the receiver identifier, and for each receiver, determines whether the receiver belongs to the SP, and then processes the message respectively according to each receiver identifier that belongs to the SP.

For example, the SP could copy the contents of the message, wherein the number of the copied is the same as the number of the receivers that belong to the SP and each receiver identifier corresponds respectively to the content of the message. The SP processes the corresponding content of the message respectively according to the different receiver identifiers, e.g. transmits the content of the message to the each receiver that belongs to the SP respectively. For the receiver that does not belong to the SP, the SP would not process the message for it.

Figure 4:
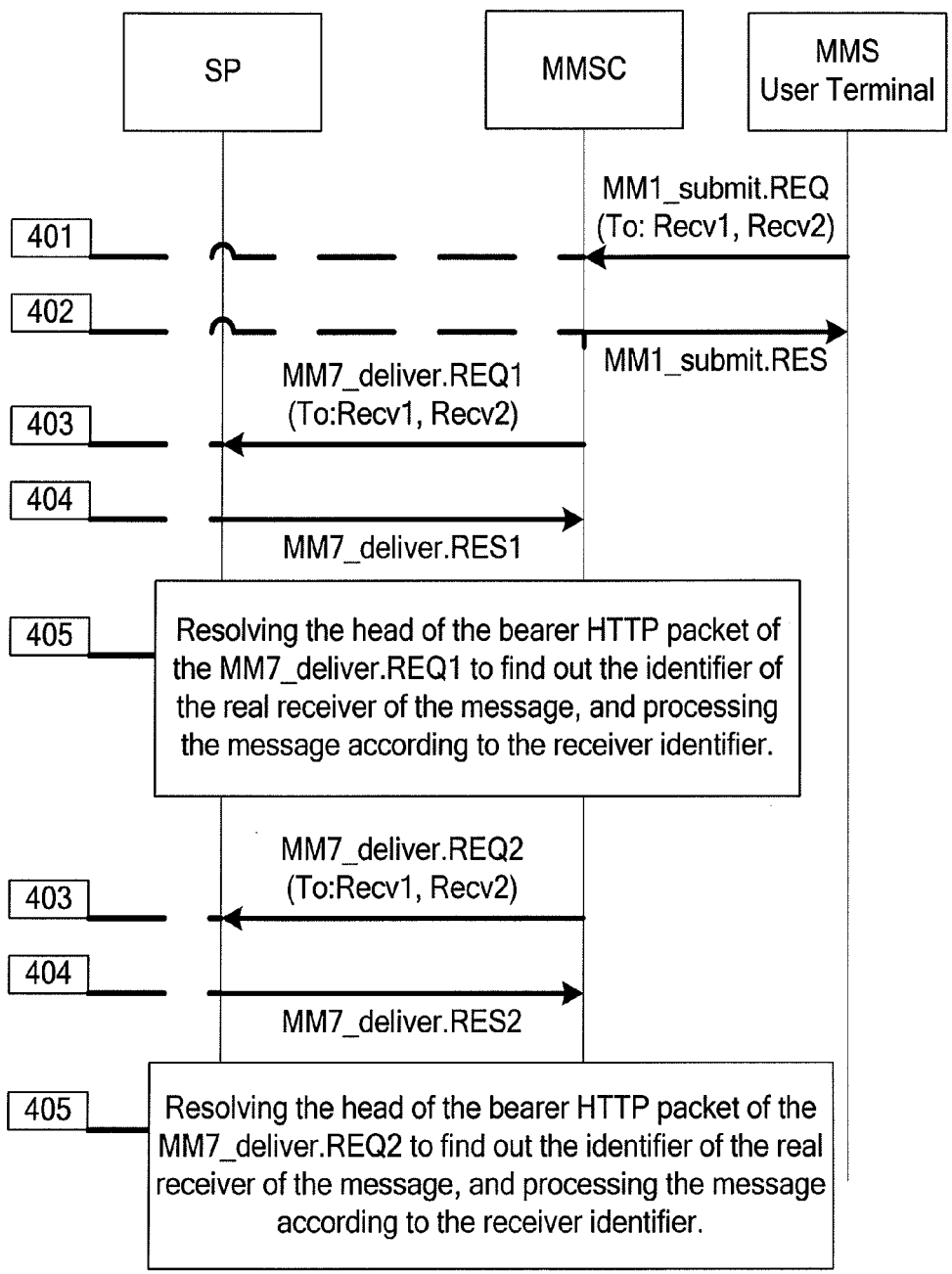
FIG. 4 is a flowchart illustrating the process in accordance with another embodiment of the method for processing messages in the MMS.

FIG. 4 is a flowchart illustrating the process in accordance with another embodiment of the method for processing messages in the MMS. Referring to FIG. 4, the flow includes the follow steps.

Step 401~Step 402: the User Agent of the terminal submits the message to the MMSC via the MM1_submit.REQ; after receiving the request, the MMSC returns the response to the User Agent via the MM1_submit.RES.

Step 403: the MMSC resolves the receivers of the received message, and copies the message according to the number of the receivers of the message, wherein the number of the copied messages is the same as the number of the receivers and each message corresponds to a receiver respectively; the MMSC delivers the message to the SP to which each receiver belongs, and adds a field of receiver ID, e.g. the X-Mms-RctpTo, to the packet head of the HTTP packet that bears the MM7_deliver.REQ. The field of receiver ID in the packet head is used to carry the receiver ID corresponding to the message.

Herein, supposing that there are two receivers of the message, Recv1 and Recv2 respectively which both belong to the same SP, the MMSC sends the MM7_deliver.REQ1 and MM7_deliver.REQ2 to the SP respectively, wherein the packet head of the HTTP packet that bears the MM7_deliver.REQ1 carries the identifier of the first receiver Recv1, and the packet head of the HTTP message that bears the MM7_deliver.REQ2 carries the identifier of the second receiver Recv2.

Certainly, after receiving the MM1_submit.REQ, the MMSC could first judge whether there are two or more than two receivers of the message and whether there are two or more than two receivers of the message belonging to the same SP. If there are, the MMSC processes the message according to Step 403, otherwise the MMSC processes the message based on the current process.

In fact, the condition that there is only one receiver of the message or that there are multiple receivers but the receivers are as many as the SPs to which the receivers belong, could be regarded as a special case of the cases processed in Step 403. In this point of view, it may be unnecessary for the MMSC to determine whether there are two or more than two receivers of the MM1_submit.REQ message, or whether there are two or more than two receivers belonging to the same SP; instead, the MMSC could process the message according to the method the in Step 403 directly.

Step 404: after receiving the MM7_deliver.REQ, the SP returns the MM7_deliver.RES to the MMSC so as to indicate that the SP has received the request successfully and would process the request.

For the MM7_deliver.REQ1, the SP returns the MM7_deliver.RES1; and for the MM7_deliver.REQ2, the SP returns the MM7_deliver.RES2.

Step 405: the SP reads the field of the receiver identifier, e.g. X-Mms-RctpTo, from the packet head of the received HTTP packet that bears the MM7_deliver.REQ, resolves the X-Mms-RctpTo to find out the identifier of the real receiver of the message, and processes the message which is carried in the MM7_deliver.REQ based on the receiver identifier. Herein, the SP processes the MM7_deliver.REQ1 and the MM7_deliver.REQ2 according to the foregoing method respectively. Optionally, the SP could also determine whether the resolved identifier of the real receiver belongs to the SP, if the analyzed identifier of the real receiver belongs to the SP, the SP processes the message which is carried in the MM7_deliver.REQ based on the receiver identifier, otherwise the SP ignores the MM7_deliver.REQ.

By adopting the solution according to the embodiment, besides implementing the message processing service of the terminal sending the message to multiple receivers which belong to the same SP, the resolving depth of the SP is decreased as well as the running load of the SP is reduced because the SP can process the message only via resolving the packet head of the HTTP packet.

Figure 5:
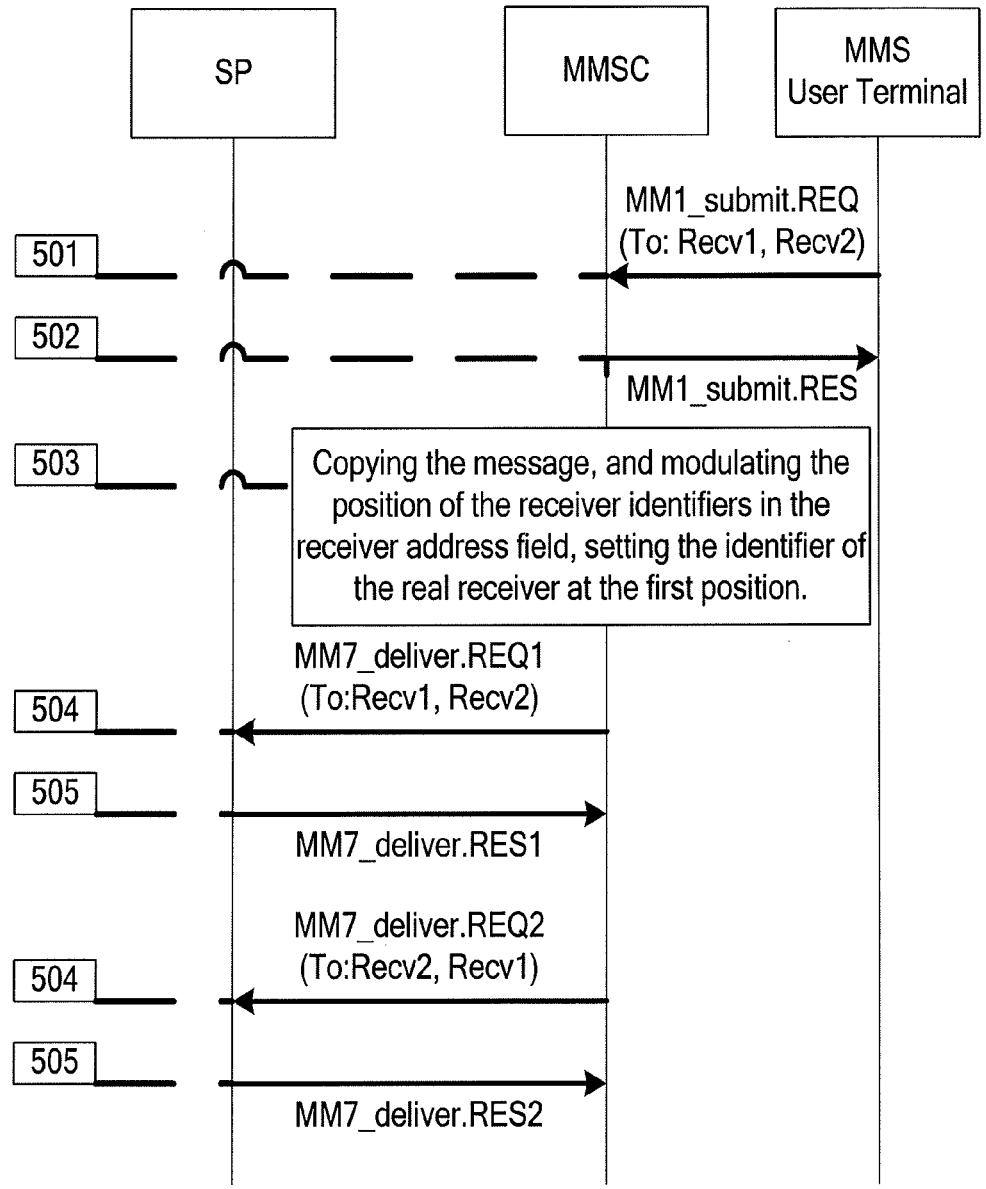
FIG. 5 is a flowchart illustrating the process in accordance with a third embodiment of the method for processing messages in MMS.

FIG. 5 is a flowchart illustrating the process in accordance with a third embodiment of the method for processing messages in the MMS. Referring to FIG. 5, the flow includes the following steps.

Step 501~Step 502: the User Agent of the terminal submits the message to the MMSC via the MM1_submit.REQ; after receiving the request, the MMSC returns the response to the User Agent via the MM1_submit.RES.

Step 503: the MMSC resolves the receivers of the received message, and copies the message according to the number of the receivers of the message, wherein the number of the copied messages is the same as the number of the receivers and each message corresponds to one receiver respectively; moreover, the MMSC modulates the sequence of the receiver identifiers carried in the receiver address field of the MM7_deliver.REQ which bears each message and which is to be delivered, setting the identifier of the real receiver of the message at the first position.

Certainly, after receiving the MM1_submit.REQ, it could first determine whether there are two or more than two receivers of the message and whether there are two or more than two receivers of the message belonging to the same SP. If there are, the MMSC processes the message according to Step 503, otherwise the MMSC processes the message based on the current flow.

In fact, the condition that there is only one Receiver of the message or that there are multiple receivers but the receivers are as many as the SPs to which the receivers belong, could be regarded as a special case of the cases processed in Step 503. In this point of view, it may be unnecessary for the MMSC to determine whether there are two or more than two receivers of the MM1_submit.REQ message or whether there are two or more than two receivers belonging to the same SP; instead the SP MMSC process the message according to Step 503 directly.

Step 504: the MMSC delivers the message to the SP to which the receiver belongs respectively via the MM7_deliver.REQ; the receiver address of the message is at the first position of the receiver address field of the MM7_deliver.REQ in turn.

Herein, supposing that there are two receivers of the message which both belong to the same SP, the MMSC sends the SP the MM7_deliver.REQ1 and the MM7_deliver.REQ2 respectively, wherein at the first position of the receiver address field of the MM7_deliver.REQ1 locates the first receiver identifier of the message, and at the first position of the receiver address field of the MM7_deliver.REQ2 locates the second receiver identifier of the message.

Step 505: after receiving the MM7_deliver.REQ, according to the current processing flow, the SP resolves the receiver address field in the received MM7_deliver.REQ to find out the receiver identifier at the first position, and determines whether the receiver belongs to the SP. If the receiver belongs to the SP, the SP processes the message according to the receiver identifier; furthermore, the SP returns the MM7_deliver.RES to the MMSC, indicating that the SP has received the request successfully and would process the request. For the MM7_deliver.REQ1, the SP returns the MM7_deliver.RES1; and for the MM7_deliver.REQ2, the SP returns the MM7_deliver.RES2. Herein, the SP processes the MM7_deliver.REQ1 and MM7_deliver.REQ2 respectively via the foregoing processing method. Certainly, it may be unnecessary for the SP to determine whether the receiver identifier at the first position belongs to the SP; instead the SP could process the message based on the receiver identifier directly.

In order to implement the technical solution in accordance with the embodiment of the present disclosure, it is necessary to add new modules to the MMSC and/or the SP, or to modify the function of the current modules. The message processing system in the MMS in accordance with the disclosure is shown in FIG. 6.

Figure 6:
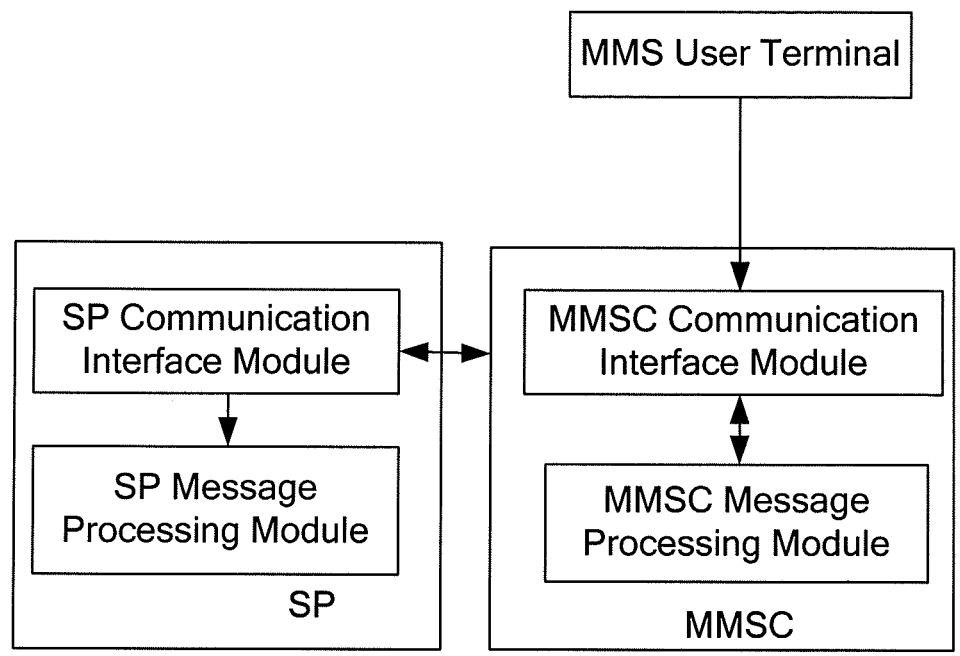
FIG. 6 is a schematic diagram illustrating a system for processing messages in the MMS according to an embodiment of the present disclosure.

As shown in FIG. 6, the MMSC includes an MMSC communication interface module and an MMSC message processing module; and the SP includes an SP communication interface module and an SP message processing module.

The MMSC communication interface module is used for receiving the MM1_submit.REQ sent by the MMS user terminal, and for conveying the received MM1_submit.REQ to the MMSC message processing module while sending the MM1_submit.RES to the MMS user terminal. The MMSC communication interface module is further used for sending the MM7_deliver.REQ from the MMSC message processing module to the SP.

The MMSC message processing module is used for generating the corresponding MM7_deliver.REQ according to the MM1_submit.REQ conveyed from the MMSC communication interface module so as to notify the home Value Added Service Applications server, to which the receiver of the message belongs, to process the message according to the receiver identifier that is carried in the message and that belongs to the Value Added Service Applications server. Furthermore, The MMSC message processing module conveys the generated MM7_deliver.REQ to the MMSC communication interface module to be sent.

The SP communication interface module is used for receiving the MM7_deliver.REQ sent by the MMSC, and for conveying the received MM7_deliver.RES to the SP message processing module while returning the MM7_deliver.RES to the MMSC.

The SP message processing module is used for handling the message according to the receiver address in the received MM7_deliver.REQ.

To be specific, corresponding to the first embodiment provided in the disclosure, the MMSC message processing module is used to determine the SPs to which the receivers in the MM1_submit.REQ respectively belong, and to generate one MM7_deliver.REQ for each determined SP. The receiver address field of the MM7_deliver.REQ generated for a certain SP includes all receiver identifiers carried in the MM1_submit.REQ. Furthermore, the MMSC message processing module conveys the generated MM7_deliver.REQs to the MMSC communication interface module.

Corresponding to the first embodiment provided in the present disclosure, the SP message processing module is used to process the MM7_deliver.REQs respectively according to the receiver identifiers, which belong to the SP, in the received MM7_deliver.REQ. For example, the SP could transmit the message in the MM7_deliver.REQ to the receivers respectively. That is to say, the SP message processing module needs to include a judgment sub-module, whose input is the receiver identifier and output is the judgment result of whether the inputted receiver identifier belongs to the SP.

Corresponding to the second embodiment provided in the present disclosure, the MMSC message processing module is used to determine the SPs to which the receivers in the MM1_submit.REQ belong, and to generate one MM7_deliver.REQ for each receiver. When generating the HTTP packet, which bears the MM7_deliver.REQ, for one of the receivers that belong to the same SP, the MMSC message processing module further carries the identifier of the receiver in the packet head of the HTTP packet. For instance, supposing that the three receivers A, B and C all belong to the SP1, the MMSC message processing module carries the identifier of the receiver A in the packet head of the bearer HTTP packet when generating the MM7_deliver.REQ for the receiver A, carries the identifier of the receiver B in the packet head of the bearer HTTP packet when generating the MM7_deliver.REQ for the receiver B, and carries the identifier of the receiver C in the packet head of the bearer HTTP packet when generating the MM7_deliver.REQ for the receiver C. Furthermore, the MMSC message processing module conveys the generated MM7_deliver.REQs to the MMSC communication interface module.

Corresponding to the second embodiment provided in the present disclosure, the SP message processing module is used to resolve the packet head of the HTTP packet which carries the MM7_deliver.REQ to find out the identifier of the real receiver of the message in the MM7_deliver.REQ, and to process the received MM7_deliver.REQ according to the found identifier of the real receiver. For example, the SP could transmit the message in the MM7_deliver.REQ to the real receiver. Certainly, herein, the SP message processing module also could optionally include a judgment sub-module, whose input is the receiver identifier and output is the judgment result of whether the input receiver identifier belongs to the SP.

Corresponding to the third embodiment provided in the present disclosure, the MMSC message processing module is used to determine the SPs to which the receivers in the MM1_submit.REQ belong, and to generate one MM7_deliver.REQ for each receiver. When generating the MM7_deliver.REQ for one of the multiple receivers belonging to the same SP, the MMSC message processing module modulates the receiver address field in the MM7_deliver.REQ, setting the identifier of the receiver at the first position.

For example, supposing the three receivers A, B and C all belong to the SP1, the MMSC message processing module sets the identifier of the receiver A at the first position of the receiver address field of the MM7_deliver.REQ when generating the MM7_deliver.REQ for the receiver A, sets the identifier of the receiver B at the first position of the receiver address field of the MM7_deliver.REQ when generating the MM7_deliver.REQ for the receiver B; and sets the identifier of the receiver C at the first position of the receiver address field of the MM7_deliver.REQ when generating the MM7_deliver.REQ for the receiver C. Further more, the MMSC message processing module conveys the generated MM7_deliver.REQs to the MMSC communication interface module.

Corresponding to the third embodiment provided in the present disclosure, the function of the SP message processing module in accordance with the embodiment is the same as the function of the SP message processing module in accordance with the prior art. In other words, the SP message processing module processes the MM7_deliver.REQ according to the first receiver identifier in the receiver address fields of the MM7_deliver.REQ. For example, the SP could transmit the message in the MM7_deliver.REQ to the first receiver of the receiver address field. Certainly, herein, the SP message processing module also could optionally include a judgment sub-module, whose input is the receiver identifier and output is the judgment result of whether the input receiver identifier belongs to the SP.

The foregoing description is just three preferred embodiments of the disclosure, and is not to be used to limit the protection scope thereof. Any modification, equivalent replacement and improvement based on the principle and spirit of the disclosure should be covered within the protection scope of the invention.

What is claimed is:

1. A method, executed by a Multimedia Messaging Service Center (MMSC) in a network, for processing a message targeting multiple receivers belonging to one or more Value Added Service Application Servers (VASASs), the VASASs used to provide value added services for a Multiple Messaging Service (MMS), the method comprising:

receiving the message from a user side equipment;

determining that the message indicates a plurality of receivers belonging to a number of VASASs;

generating copies of the message according to the number of VASASs: and delivering the copies of the message to the number of VASASs, respectively;

wherein the MMSC determines the number of VASASs according to the Value Added Service Identifier (VASID) and the Service Code indicated in the message.

2. A Multimedia Messaging Service Center (MMSC) in a network for processing a message targeting multiple receivers belonging to one or more Value Added Service Application Servers (VASASs), the VASASs used to provide value added services for a Multiple Messaging Service (MMS), the MMSC comprising:

a memory;

a processor coupled to the memory, the processor configured to:

receive the message from a user side equipment;

determine that the message indicates a plurality of receivers belonging to a number of VASASs;

generate copies of the message according to the number of VASAS; and deliver the copies of the message to the number of VASASs, respectively;

wherein the MMSC determines the number of VASASs according to the Value Added Service Identifier (VASID) and the Service Code indicated in the message.

* * * * *